United States Patent [19]

Sakane et al.

[11] Patent Number: 5,401,081
[45] Date of Patent: Mar. 28, 1995

[54] ANTI-SKID CONTROL SYSTEM FOR DRIVEN WHEELS

[75] Inventors: Shinsuke Sakane, Toyota; Hiroyuki Ichikawa, Okazaki; Satoru Fukushima, Chiryu; Chiaki Hamada, Susono, all of Japan

[73] Assignee: Aisin Seiki Kabushiki Kaisha, Kariya, Japan

[21] Appl. No.: 13,085

[22] Filed: Feb. 3, 1993

[30] Foreign Application Priority Data

Feb. 6, 1992 [JP] Japan .................. 4-056884

[51] Int. Cl.$^6$ ............................................. B60T 8/10
[52] U.S. Cl. ............................... 303/103; 303/111
[58] Field of Search ............. 303/111, 100, 102, 103; 364/426.02

[56] References Cited

U.S. PATENT DOCUMENTS

| | | | |
|---|---|---|---|
| 3,926,477 | 12/1975 | Klatt | 303/111 |
| 4,154,487 | 5/1979 | Vannini et al. | 303/111 X |
| 4,288,127 | 9/1981 | Leiber et al. | 303/111 |
| 4,734,421 | 2/1983 | Leiber | 303/111 X |
| 4,997,236 | 3/1991 | Naito et al. | 303/100 X |
| 5,000,522 | 3/1991 | Matsuda et al. | 303/100 |
| 5,016,178 | 5/1991 | Kuwana et al. | 303/110 X |
| 5,176,430 | 1/1993 | Kuwana et al. | 303/100 |
| 5,188,432 | 2/1993 | Schmitt et al. | 303/111 X |
| 5,210,693 | 5/1993 | Kuwana et al. | 303/100 X |
| 5,230,550 | 7/1993 | Braschel et al. | 303/111 X |

FOREIGN PATENT DOCUMENTS 7649 1/1991 Japan .................. 303/111

Primary Examiner—Robert J. Oberleitner
Assistant Examiner—Kevin D. Rutherford
Attorney, Agent, or Firm—Burns, Doane, Swecker & Mathis

[57] ABSTRACT

The invention is directed to an arrangement for controlling a braking force applied to each of driven wheels and non-driven wheels depending upon a braking condition, with a hydraulic braking pressure supplied to each of wheel brake cylinders through an actuator. The actuator is controlled by the braking force controller into which output signals of wheel speed sensors are fed. The braking force controller is arranged to control the hydraulic braking pressure supplied to each of the wheel brake cylinders. When one driven wheel is under the anti-skid control, it is determined whether a difference speed between the driven wheels is greater than a predetermined value. If it is determined that the difference speed is greater than the predetermined value, the actuator is actuated to restrain the hydraulic braking pressure from being supplied to the wheel brake cylinder operatively connected to the other driven wheel, e.g., to hold the hydraulic braking pressure supplied to the wheel brake cylinder, or to reduce a rate of increase of the hydraulic braking pressure.

6 Claims, 7 Drawing Sheets

ANTI-SKID CONTROL SYSTEM FOR DRIVEN WHEELS

BACKGROUND OF THE INVENTION

1. Field of the Invention

The present invention relates to an anti-skid control system for controlling the braking force applied to road wheels in a braking operation of an automotive vehicle to prevent the road wheels from being locked, and more particularly to an anti-skid control system for appropriately controlling the braking force applied to driven wheels which are linked by a differential gear mechanism.

2. Description of the Prior Art

In order to prevent road wheels from being locked, there has been employed an anti-skid control system which controls the braking force by decreasing, increasing, or holding a hydraulic braking pressure supplied to each wheel brake cylinder operatively connected to each road wheel. In the anti-skid control system, as disclosed in the U.S. Pat. No. 5,016,178 for example, a rotational speed of each road wheel or wheel speed is detected, on the basis of which either one of a decrease mode, an increase mode and a hold mode is determined for each wheel brake cylinder, and the hydraulic braking pressure in each wheel brake cylinder is controlled in response to the determined mode, so as to obtain the maximum coefficient of friction.

In general, an ordinary passenger vehicle has a pair of road wheels at each of its front and rear sides. either the front road wheels or the rear road wheels are operatively connected with the internal combustion engine to be driven directly thereby, while the rest of the wheels are not connected with the engine so as to be non-driven wheels. A vehicle having the driven wheels at its front side is called a front drive vehicle, while a vehicle having the driven wheels at its rear side is called a rear drive vehicle. Further, there has been provided a differential gear mechanism for compensating a difference between the rotational speeds of the right and left driven wheels so as to ensure a smooth driving of the vehicle. In other words, the right and left driven wheels are controlled by means of the differential gear mechanism such that a total speed of the rotational speeds of the right and left driven wheels is maintained to be constant.

Especially, according to a vehicle having a manually shifted transmission, when the transmission is in such a condition that its gears are meshed for shifting, if the anti-skid operation begins and a large skid occurs on one of the driven wheels, the other one of the driven wheels will be restrained from skidding by means of the differential gear mechanism, so that the hydraulic braking pressure in the wheel cylinder (hereinafter, simply referred to as the wheel cylinder pressure) will be raised. Consequently, if one of the driven wheels is recovered from skidding so that an engine torque is equally applied to the right and left driven wheels, a larger skid will occur on the other one of the driven wheels, because the wheel cylinder pressure applied thereto has been raised to a high pressure. Thus, when the anti-skid control operation begins, the large skid occurs alternately between the right and left driven wheels to cause a vibration of a vehicle body, so that a brake feeling is deteriorated.

Hereinafter will be described the above-described vehicle vibration caused in the anti-skid control operation of the above-described prior art with reference to FIG. 7, which shows variation of a wheel speed Vwr of a driven wheel DR at the fore right side of a front drive vehicle for example, a wheel speed Vwf of a driven wheel DL at the fore left side of the vehicle, and wheel cylinder pressures Pwr, Pwf for the driven wheels DR, DL.

At the outset, when the skid occurs on the driven wheel DR at the fore right side, a large driving torque is transmitted to the driven wheel DL at the fore left side by means of the differential gear mechanism, so that the driven wheel DL is restrained from skidding and the wheel cylinder pressure Pwf continues to be increased. When the wheel cylinder pressure Pwr for the driven wheel DR is decreased at a position "a" in FIG.7, and the wheel speed Vwr of the driven wheel DR is recovered to cause the differential gear mechanism to operate, the wheel cylinder pressure Pwf for the driven wheel DL is so high that a large skid of the driven wheel DL occurs, and the decrease of the wheel cylinder pressure Pwf begins at a position "b". In other words, since the wheel cylinder pressure Pwf for the driven wheel DL is large during the period of the position "a" to the position "b", the driven wheel DL skids to a large extent, so that the wheel cylinder pressure Pwf begins to be decreased at the position "b". When the wheel cylinder pressure Pwf for the driven wheel DL is increased at a position "c" and the wheel speed Vwf begins to be recovered, the wheel speed Vwr of the driven wheel DR is decreased by means of the differential gear mechanism, and the wheel cylinder pressure Pwr begins to be decreased at a position "d". Thus, a large skid occurs alternately on the driven wheels DR, DL, so that the wheel speeds Vwr, Vwf vary as shown in FIG. 7.

In order to prevent the above-described vibration of the vehicle body from occurring, an electromagnetic clutch mechanism, for example, may be provided to shift the gears into a neutral position at the time when the anti-skid control begins. Or, a so-called idle-up apparatus may be provided to increase an idling speed of the engine at the time when the anti-skid control begins. However, the provision of an electromagnetic clutch mechanism, idle-up apparatus and the like necessarily result in an increase in cost.

SUMMARY OF THE INVENTION

Accordingly, it is an object of the present invention to provide an anti-skid control system for driven wheels linked by a differential gear mechanism, which prevents the wheels from skidding to ensure a stable braking operation.

In accomplishing the above and other objects, an anti-skid control system for an automotive vehicle having a pair of driven wheels and a pair of non-driven wheels comprises wheel brake cylinders which are operatively connected to the driven wheels and non-driven wheels, respectively, for applying the braking force thereto, a hydraulic pressure generator for supplying a hydraulic braking pressure to each of the wheel brake cylinders, actuating means which is disposed between the hydraulic pressure generator and each of the wheel brake cylinders for controlling the hydraulic braking pressure in each of the wheel brake cylinders, and wheel speed detecting means for detecting a wheel speed of each of the driven wheels and non-driven wheels, and providing an output signal corresponding to the wheel speed respectively. The anti-skid control system is provided with braking force control means for controlling the actuating means in response to the output signal of the wheel speed detecting means to control the braking force applied to at least the driven wheels. The braking force control means includes determination means for determining whether a speed differential between the wheel speeds of the driven wheels is greater than a predetermined value, when the braking force applied to one of the driven wheels is controlled by the actuating means, and decrease restraining means for restraining the hydraulic braking pressure from being supplied to one of the wheel brake cylinders which is operatively connected to the other one of the driven wheels, when the determination means determines that the speed differential is greater than the predetermined value.

In the above-described anti-skid control system, the increase restraining means may be arranged to hold the hydraulic braking pressure supplied to the wheel brake cylinder, or arranged to reduce a rate of increase of the hydraulic braking pressure.

BRIEF DESCRIPTION OF THE DRAWINGS

The above stated objects and following description will become readily apparent with reference to the accompanying drawings, wherein like reference numerals denote like elements, and in which.

DESCRIPTION OF THE PREFERRED EMBODIMENTS

Figure 1:
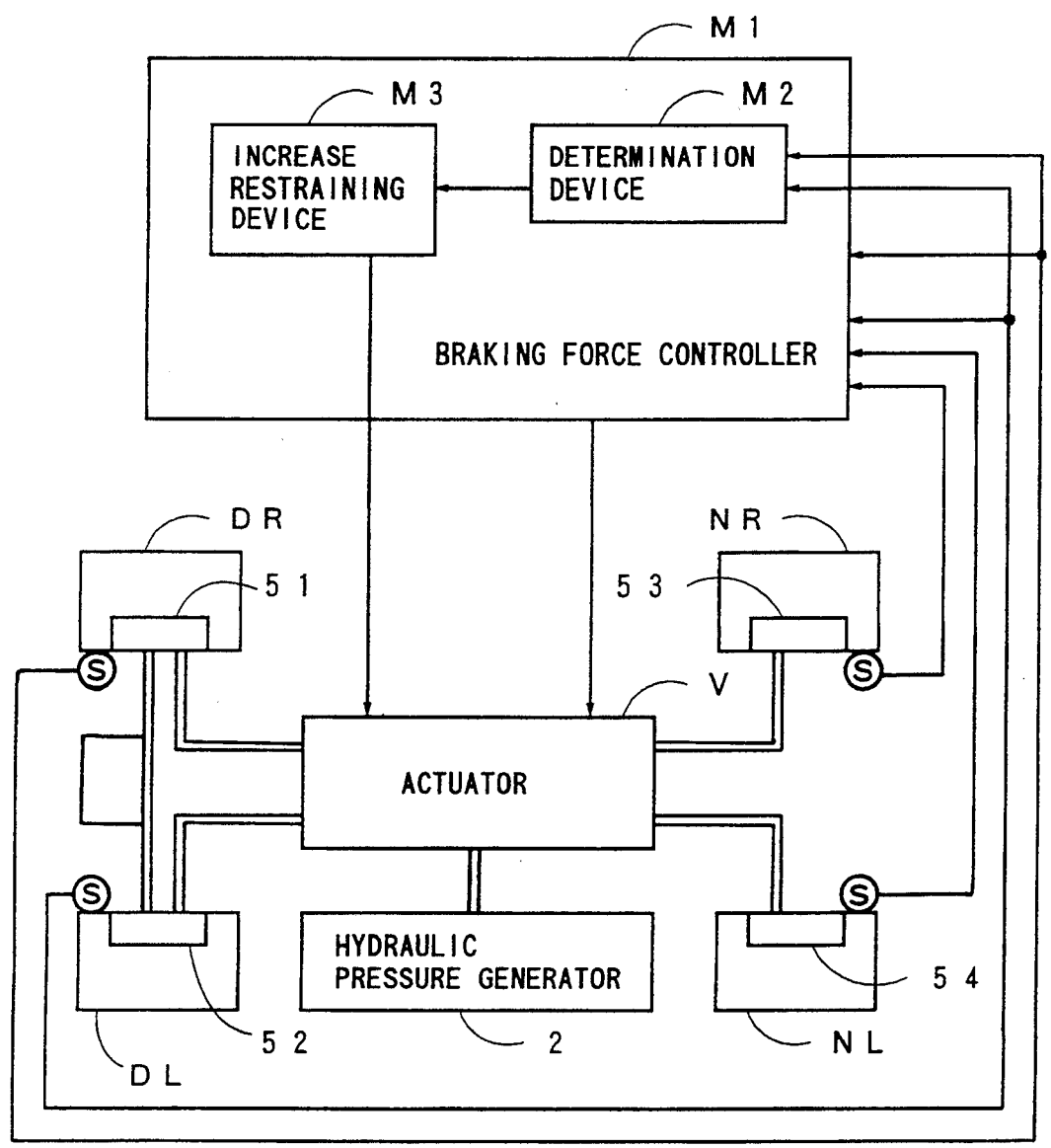
FIG. 1 is a general block diagram illustrating an anti-skid control system according to the present invention.

Referring to FIG. 1, there is schematically illustrated an anti-skid control system according to the present invention, which controls a braking force applied to each of the road wheels including driven wheels DR, DL and non-driven wheels NR, NL of a vehicle depending upon a braking condition. In this anti-skid control system, it is so arranged that when the hydraulic pressure generator 2 is operated, a hydraulic braking pressure is supplied from a pressure generator 2 to each of the wheel brake cylinders 51 to 54 through an actuator V, so that a braking force is applied to each of the driven wheels DR, DL and non-driven wheels NR, NL. And, a wheel speed of each of the road wheels is detected by wheel speed sensors S, respectively. The actuator V is controlled by the braking force controller M1, into which output signals of the wheel speed sensors S are fed. The braking force controller M1 includes a determination device M2 and an increase restraining device M3, and is arranged to control the hydraulic braking pressure supplied to each of the wheel brake cylinders 51 to 54. In the determination device M2, when one driven wheel (e.g., driven wheel DR) is under the anti-skid control, it is determined whether a speed differential between the driven wheels DR and DL is greater than a predetermined value, or not. If it is determined that the speed differential is greater than the predetermined value, the increase restraining device M3 actuates the actuator V to hold the hydraulic braking pressure supplied to the wheel brake cylinder which is operatively connected to the other driven wheel (e.g., driven wheel DL), or reduce a rate of increase of the hydraulic braking pressure, so as to restrain the hydraulic braking pressure from being supplied to the wheel brake cylinder.

Figure 2:
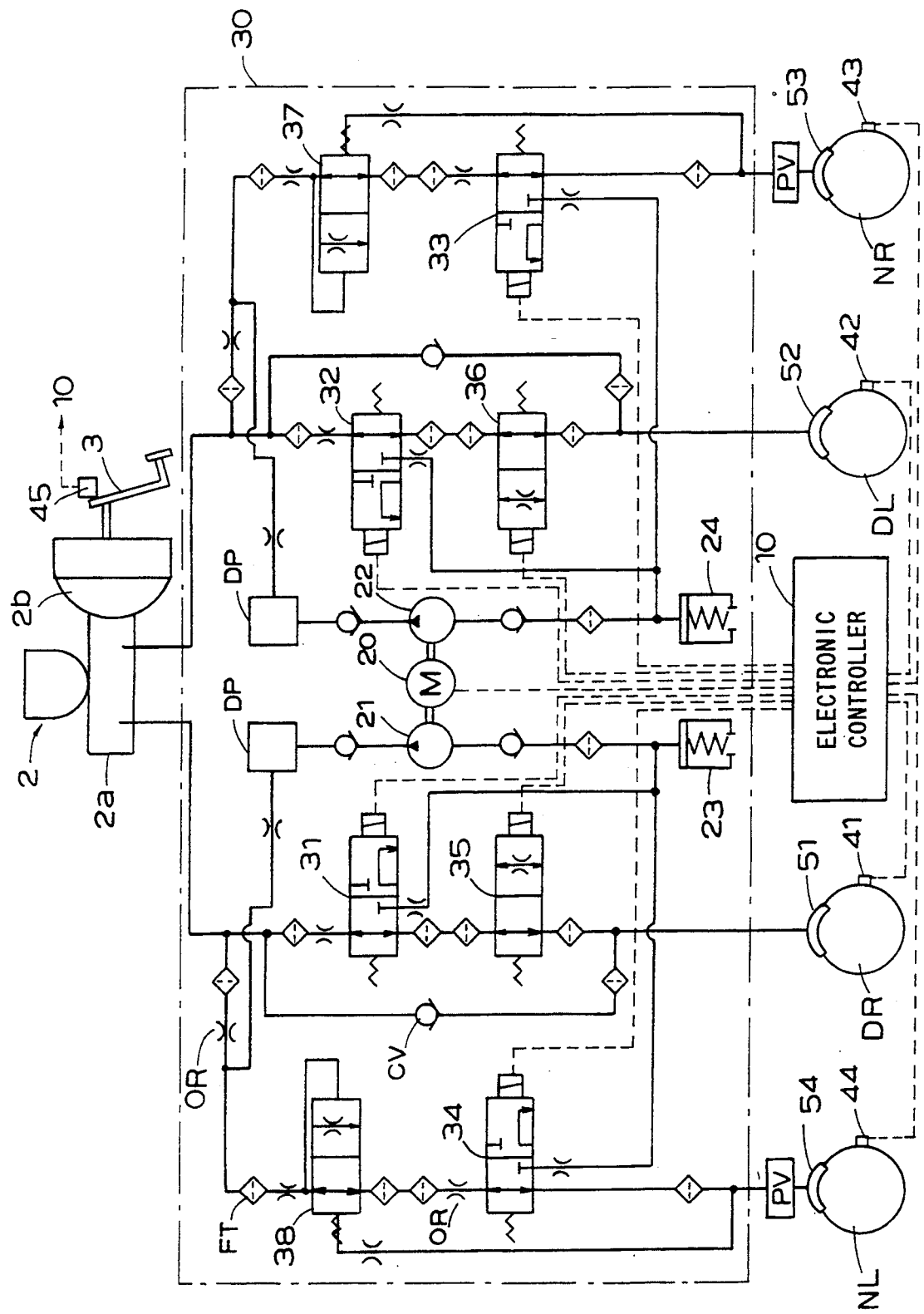
FIG. 2 is a schematic block diagram of an anti-skid control system of an embodiment of the present invention.

More specifically, an embodiment of the present invention is illustrated in FIGS. 2 to 5. Referring to FIG. 2, there is illustrated an anti-skid control system for a front drive vehicle, wherein pumps 21, 22, reservoirs 23, 24, solenoid valves 31 to 36 and pressure control valves 37, 38 are disposed in hydraulic circuits for connecting a hydraulic pressure generator 2, which comprises a master cylinder 2a and a booster 2b operated in response to depression of a brake pedal 3, to wheel brake cylinders 51 to 54 operatively connected to the driven wheels DR, DL and non-driven wheels NR, NL, respectively. The driven wheel DR designates a road wheel at the fore right side as viewed from the position of a driver's seat, the driven wheel DL designates a road wheel at the fore left side, the non-driven wheel NR designates a road wheel at the rear right side, and the non-driven wheel NL designates a road wheel at the rear left side.

Between the hydraulic pressure generator 2 and wheel brake cylinders 51 to 54, there is disposed an actuator 30 which corresponds to the actuator V in FIG. 1. The actuator 30 includes the solenoid valves 31, 35 which are disposed in the hydraulic circuit for connecting one output port of the master cylinder 2a to the wheel brake cylinder 51, and the solenoid valve 34 and pressure control valve 38 which are disposed in the hydraulic circuit for connecting the output port of the master cylinder 2a to the wheel brake cylinder 54, and the pump 21 is disposed between the master cylinder 2a and these valves. Similarly, the solenoid valves 32, 36, and the solenoid valve 33 and pressure control valve 37 are disposed respectively in the hydraulic circuits for connecting the other output port of the master cylinder 2a to the wheel brake cylinders 52, 53, and the pump 22 is disposed between the master cylinder 2a and these valves. The pumps 21, 22 are driven by an electric motor 20, so that brake fluid raised to a predetermined pressure is supplied to these hydraulic circuits. Accordingly, these hydraulic circuits serve as the circuits through which the hydraulic braking pressure is supplied to the solenoid valves 31, 32 and the pressure control valves 37, 38. The hydraulic circuits at the drain side of the solenoid valves 31, 34 are connected to the pump 21 through the reservoir 23, and the hydraulic circuit at the drain side of the solenoid valves 32, 33 are connected to the pump 22 through the reservoir 24. Each of the reservoirs 23, 24 is provided with a piston and a spring, and functions so as to store the brake fluid returned from each of the solenoid valves 31–34 through the hydraulic circuits at the drain side thereof, and to supply the brake fluid to each of the solenoid valves 31, 32 and the pressure control valves 37, 38 when the pumps 21, 22 operate.

Each of the solenoid valves 31 to 34 is a three port-two position solenoid operated changeover valve, and is in its first operating position as shown in FIG. 2 when a current is not fed to its solenoid coil, so that each of the wheel brake cylinders 51 to 54 is communicated with the hydraulic pressure generator 2 and the pump 21 or 22. When the current is fed to the solenoid coil, each solenoid valve is changed over to its second operating position, so that each of the wheel brake cylinders 51 to 54 is shut off from the communication with the master cylinder 2a and the pump 21 or 22, and is communicated with the reservoir 23 or 24. Each of the solenoid valves 35, 36 is a two port-two position solenoid operated changeover valve, and is in its first operating position as shown in FIG. 2 when a current is not fed to its solenoid coil. When the current is fed to the solenoid coil, each solenoid valve is changed over to its second operating position of a small diameter orifice, so that a gradual increase mode or gradual decrease mode, which will be described later, is selected for a pressure control mode in the anti-skid control operation.

The pressure control valves 37, 38 are arranged to change over in response to a pressure difference between the hydraulic braking pressure of the master cylinder 2a disposed at their upstream sides and the hydraulic braking pressure of the wheel brake cylinders 53, 54 disposed at the downstream sides of the solenoid valves 33, 34, respectively. Each of the valves 37, 38 is normally in its first operating position as shown in FIG. 2, and is changed over to its second operating position of a small diameter orifice, when the hydraulic pressure at the upstream side of the pressure control valves 37, 38 is greater than the pressure at the downstream side by a predetermined pressure. That is, in the normal braking operation, the pressure control valves 37, 38 are positioned in the first opening positions, so that the hydraulic braking pressure of the master cylinder 2a is transmitted as it is. Whereas, in the anti-skid control operation, the abovedescribed pressure difference is caused to change over the valves 37, 38 to their second operating positions automatically, so that a rapid decrease mode for decreasing the hydraulic braking pressure rapidly and the gradual increase mode for increasing the pressure gradually by means of the small diameter orifice are provided for the pressure control mode. Check valves CV shown in FIG. 2 permit the brake fluid to return from each of the wheel brake cylinders 51 to 54 and the reservoirs 23, 24 to the hydraulic pressure generator 2, and blocks the counterflow of the brake fluid. In FIG. 2, PV denotes a proportioning valve which is provided for obtaining an ideal braking force distribution between the front and rear road wheels, FT denotes a filter, OR denotes an orifice, and DP denotes a damper. These have been known, so that the explanation thereof is omitted.

Accordingly, with each of the solenoid valves 31 to 34 energized or de-energized, the hydraulic braking pressure in each of the wheel brake cylinders 51 to 54 is decreased or increased. Namely, when the current is not fed to the solenoid coil of each of the solenoid valves 31 to 34, the hydraulic braking pressure is supplied from the hydraulic pressure generator 2 and the pump 21 or 22 to each of the wheel brake cylinders 51 to 54 to increase the hydraulic braking pressure in each wheel brake cylinder. On the other hand, when the current is fed to the solenoid coil, each of the wheel brake cylinders 51 to 54 is communicated with the reservoir 23 or 24 to decrease the hydraulic braking pressure in each wheel brake cylinder. Further, when the current is fed to each of the solenoid coils of the solenoid valves 35, 36, the hydraulic braking pressure in each wheel brake cylinder is gradually increased or gradually decreased by means of each orifice. Therefore, in addition to the rapid increase mode and rapid decrease mode provided when the electric current is not fed to the solenoid coils of the solenoid valves 35, 36, the gradual increase mode and gradual decrease mode can be provided when the electric current is fed to them.

In the present embodiment, it is so arranged that the gradual decrease mode and/or gradual increase mode can be provided by means of the solenoid valves 35, 36 or the pressure control valves 37, 38. In lieu of the solenoid valves 31 to 36 and pressure control valves 37, 38, however, a pair of two port-two position solenoid changeover valves can be provided for each of the wheel brake cylinders. By controlling these valves to be turned on and off, and controlling a time period of feeding the current to each of the valves, a so-called pulse increase mode (or, step increase mode) and pulse decrease mode, similar to the gradual increase mode and gradual decrease mode, can be provided. Thus, the increase restraining device M3 in FIG. 1 may provide a gradual decrease mode for reducing the rate of increase of the wheel cylinder pressure, or provide a hold mode for holding the wheel cylinder pressure.

The above-described solenoid valves 31 to 36 are electrically connected to the electronic controller 10 which controls the operation of the solenoid valves 31 to 36. The electric motor 20 is also connected to the electronic controller 10, so that the operation of the electric motor 20 is controlled by the electronic controller 10. At the driven wheels DR, DL and non-driven wheels NR, NL, there are provided wheel speed sensors 41 to 44 respectively, which are connected to the electronic controller 10, and by which a signal corresponding to a rotational speed of each road wheel, i.e., a wheel speed signal is fed to the electronic controller 10. Each of the wheel speed sensors 41 to 44 in the present embodiment is a well known sensor of electromagnetic induction type which comprises a pick-up having a coil wound around a permanent magnet and a rotor having an outer peripheral end thereof provided with teeth, and functions to output a voltage with a frequency proportional to the rotational speed of each road wheel. Further, a Hall IC or a photosensor or the like may be used for the wheel speed sensors 41 to 44, instead of the above-described sensor. There is also provided a brake switch 45 which is turned on when the brake pedal 3 is depressed, and turned off when the brake pedal 3 is released, and which is electrically connected to the electronic controller 10.

Figure 3:
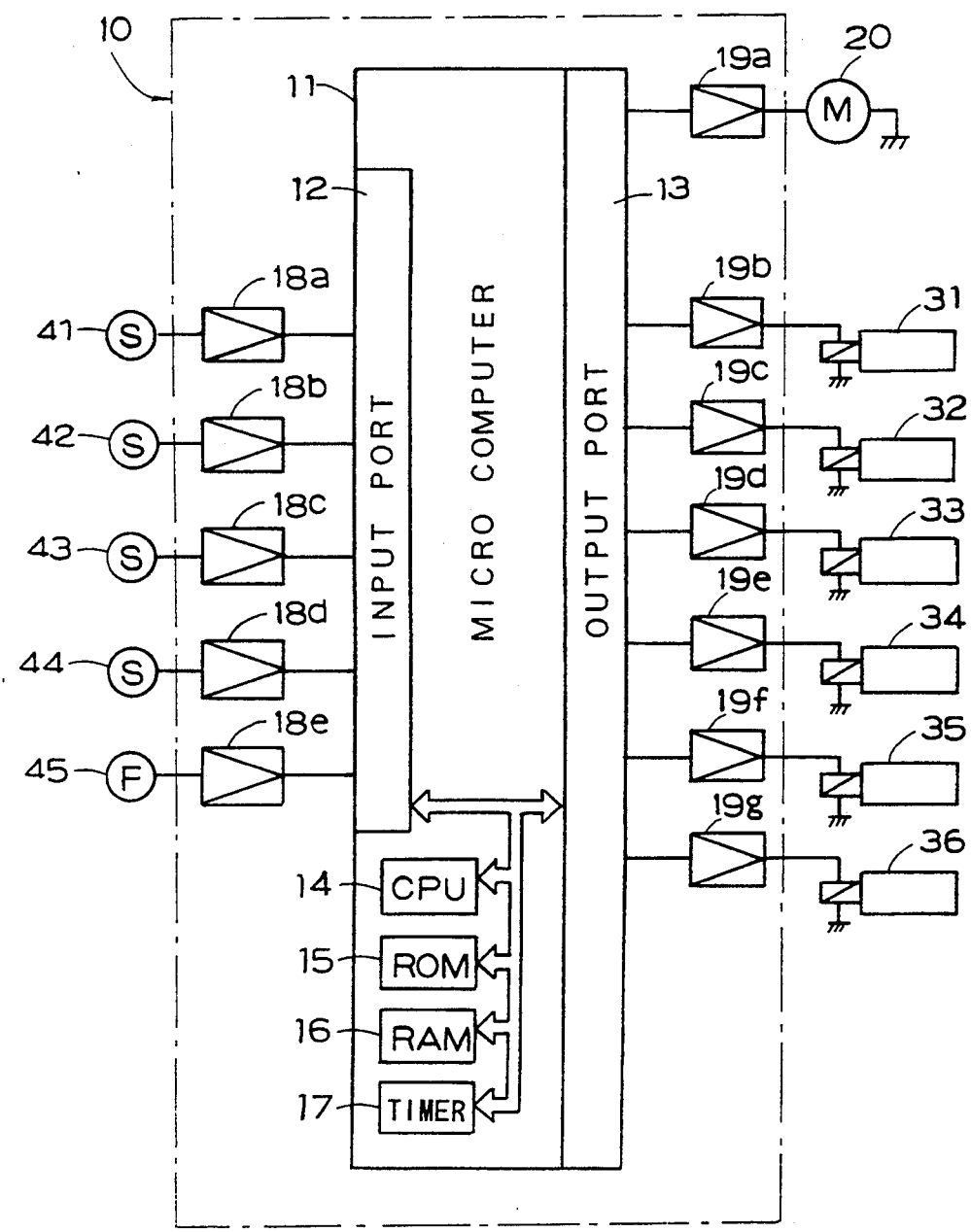
FIG. 3 is a block diagram illustrating an arrangement of an electronic controller shown in FIG. 2.

As shown in FIG. 3, the electronic controller 10 is provided with a microcomputer 11 having a central processing unit or CPU 14, a read-only memory or ROM 15, a random access memory or RAM 16 and a timer 17, which are connected with an input port 12 and an output port 13 via a common bus to execute the input/output operations relative to external circuits. The signals detected by each of the wheel speed sensors 41 to 44 and the brake switch 45 are fed to the input port 12 via respective amplification circuits 18a to 18e and then to the CPU 14. Then, a control signal is output from the output port 13 to the electric motor 20 via a drive circuit 19a, and control signals are output to the solenoid valves 31 to 36 via the respective drive circuits 19b to 19g. In the microcomputer 11, the ROM 15 memorizes a program corresponding to flowcharts shown in FIGS. 4 and 5, the CPU 14 executes the program while the ignition switch (not shown) is closed, and the RAM 16 temporarily memorizes variable data necessary for executing the program.

Figure 4:
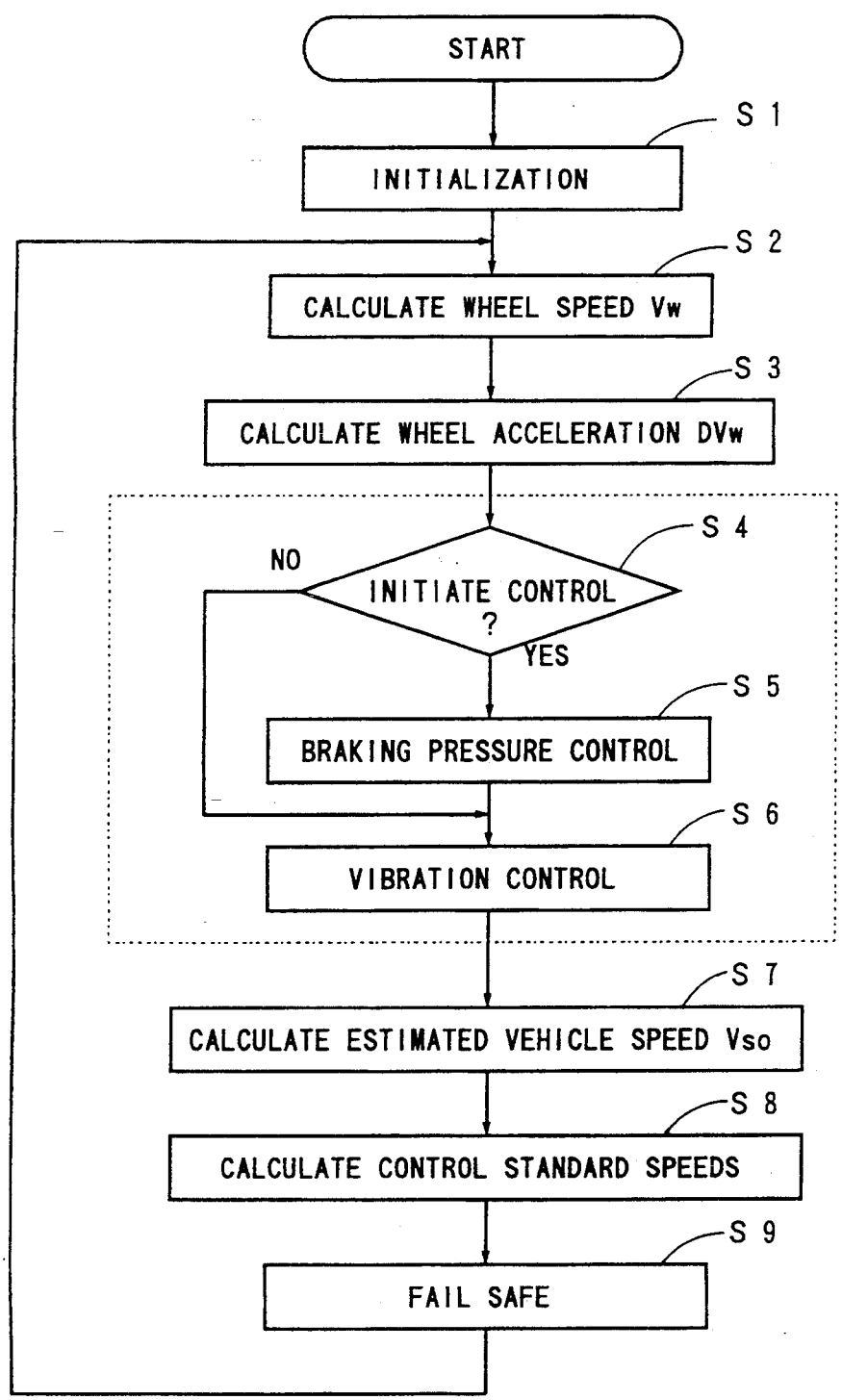
FIG. 4 is a flowchart showing the operation of the braking force control of the electronic controller according to an embodiment of the present invention.

A program routine executed by the electronic controller 10 for the anti-skid control will now be described with reference to FIGS. 4 and 5. FIG. 4 is a flowchart showing a main routine executed in accordance with a program of one embodiment of the present invention. The program routine in FIG. 4 starts when an ignition switch (not shown) is turned on, and provides for initialization of the system at Step S1 to clear various data. Then, the program proceeds to Step S2 where a wheel speed. Vw is calculated in the microcomputer 11 in accordance with the output signal from each of the wheel speed sensors 41 to 44, then to Step S3 where a wheel acceleration DVw is calculated on the basis of the wheel speed Vw of each road wheel. Next, at Step S4, locking the condition of each road wheel is determined in accordance with the output of the brake switch 45, the wheel speed Vw and wheel acceleration DVw, and the condition for initiating the anti-skid control is determined. If it is determined that the initiating condition is satisfied, the program proceeds to Step S5, otherwise it proceeds to Step S6. At Step S5, each of the solenoid valves 31 to 36 is energized or de-energized depending upon the locking condition of each road wheel, so that the hydraulic braking pressure in each of the wheel braking cylinders 51 to 54 (i.e., wheel cylinder pressure) is increased or decreased. The hydraulic braking pressure control executed in Step S5 is made in such a manner that each of the solenoid valves 31 to 36 is controlled in accordance with a slip rate, which is calculated from the estimated vehicle speed Vso and wheel speed Vw, the wheel acceleration DVw and control standard speeds Vsn, Vsh, so as to maintain the slip rate within an appropriate region in view of a coefficient of friction of the road surface and a lateral force to the vehicle. This pressure control is known in the art, so that its explanation will be omitted. Then, the program proceeds to Step S6 to execute a vibration control which will be described later in detail. Then, the program proceeds to Step S7 where the estimated vehicle speed Vso is calculated, and the control standard speeds are calculated at Step S8. After a fail-safe procedure is executed at Step S9, the program returns to Step S2. The estimated vehicle speed Vso is calculated on the assumption that a vehicle speed is increased and decreased with a predetermined acceleration and deceleration from the wheel speed. And, the control standard speeds are calculated on the basis of the estimated vehicle speed Vso.

Figure 5:
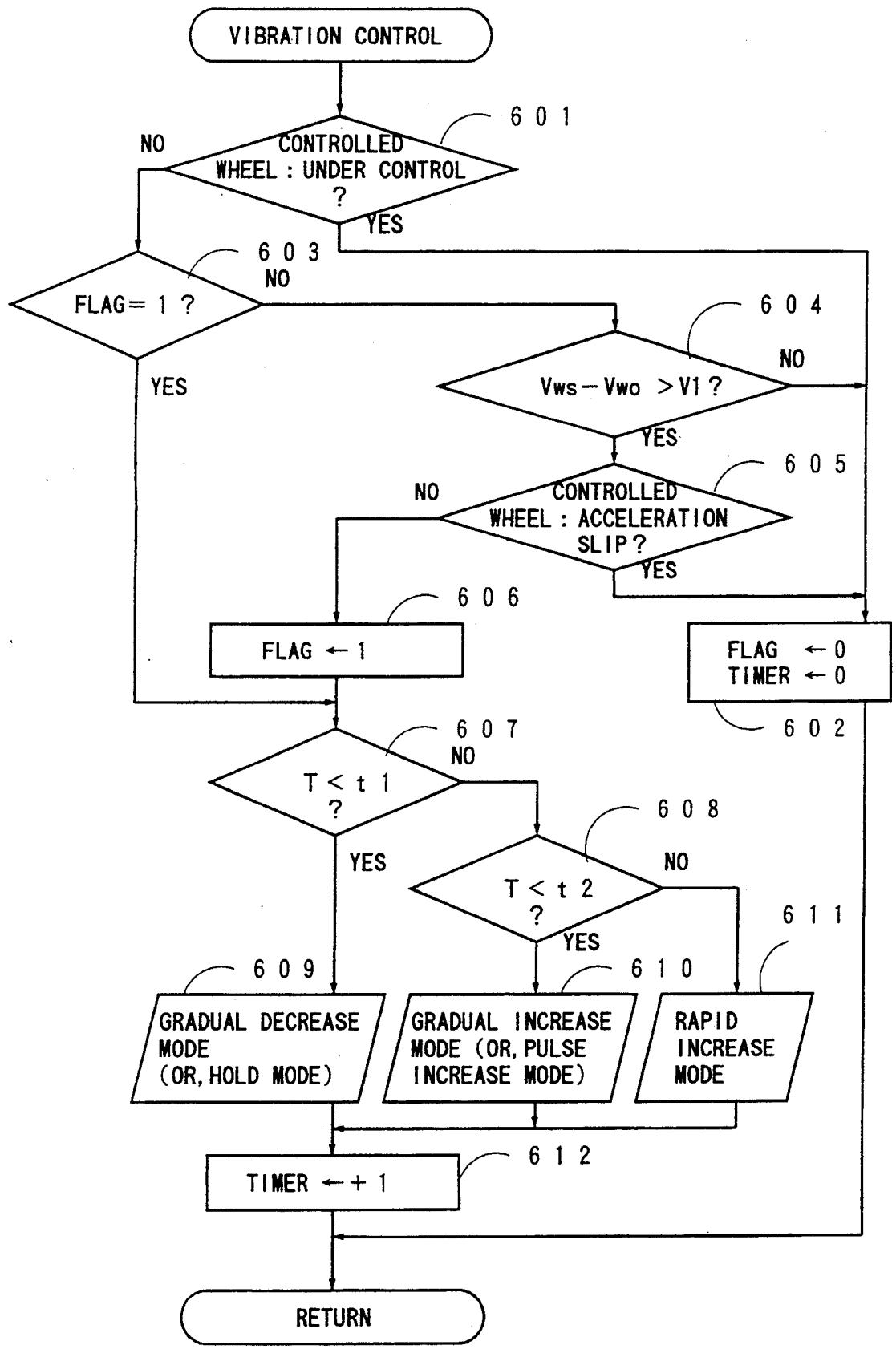
FIG. 5 is a flow chart of the vibration control in the braking force control according to the above embodiment.

FIG. 5 shows a subroutine of Step S6 in FIG. 4 for the vibration control, in which the driven wheel DL corresponds to a road wheel to be controlled according to the vibration control (hereinafter, referred to as a controlled wheel) and the driven wheel DR corresponds to a road wheel to be paired with the controlled wheel (hereinafter, referred to as a paired wheel), for example. In the case where the driven wheel DR corresponds to the controlled wheel and where the driven wheel DL corresponds to the paired wheel, the substantially same routine as shown in FIG. 5 is executed. At the outset, it is determined at Step 601 whether the anti-skid control has been initiated with respect to the controlled wheel (e.g., driven wheel DL). If it is determined that the driven wheel DL is under the anti-skid control, the program proceeds to Step 602 where a flag for executing the vibration control (hereinafter, simply referred to as the flag) is reset to be zero, and a timer for the vibration control is cleared (0), and then the program returns to the main routine. The timer for the vibration control is arranged to be set at the same time as the time when the anti-skid control begins. If it is determined that the controlled wheel is not under the anti-skid control, the program proceeds to Step 603 where it is determined whether the flag is set or not. If the flag is set, the program proceeds to Step 607. If the flag is not set, it proceeds to Step 604, where a speed differential between a wheel speed Vws of the controlled wheel (e.g., driven wheel DL) and a wheel speed Vwo of the paired wheel (e.g., driven wheel DR) is compared with a predetermined value V1. If it is determined that the speed differential exceeds the predetermined value V1, the program proceeds to Step 605. If the speed differential is not greater than the value V1, the program proceeds to Step 602.

At Step 605, it is determined whether an acceleration slip is occurring with respect to the controlled wheel (e.g., driven wheel DL). If the above-described speed differential is not a result of the acceleration slip, the flag is set at Step 606 and the program proceeds to Step 607. If the speed differential is a result of the acceleration slip, the program returns to the main routine via Step 602. In order to determine the acceleration slip, there have been known various means. For instance, it can be determined that the acceleration slip is occurring, when a speed differential between a vehicle speed calculated on the basis of the wheel speed of the non-driven wheel and a vehicle speed calculated on the basis of the wheel speed of the driven wheel exceeds a certain value.

Then, it is determined at Step 607 whether a time T corresponding to a counted value of the timer has exceeded a first predetermined time t1, and if the time T is less than the predetermined time t1, the program proceeds to Step 609 where a gradual decrease mode signal is output. In this respect, in the case where the actuator is of the type for providing the hold mode, a hold mode signal is output. If the time T exceeds the predetermined time t1, it is determined whether the time T has exceeded further a second predetermined time t2. If it is less than the predetermined time t2, the program proceeds to Step 610, where a gradual increase mode signal is output. On the contrary, if it has exceeded the predetermined time t2, the program proceeds to Step 611 where a rapid increase mode signal is output. In the case where the actuator is of the type for providing the pulse increase mode, it is so arranged that a pulse increase mode signal is output instead of the gradual increase mode signal. Then, the timer is incremented, i.e., added by one (+1), and the program returns to the main routine.

Figure 6:
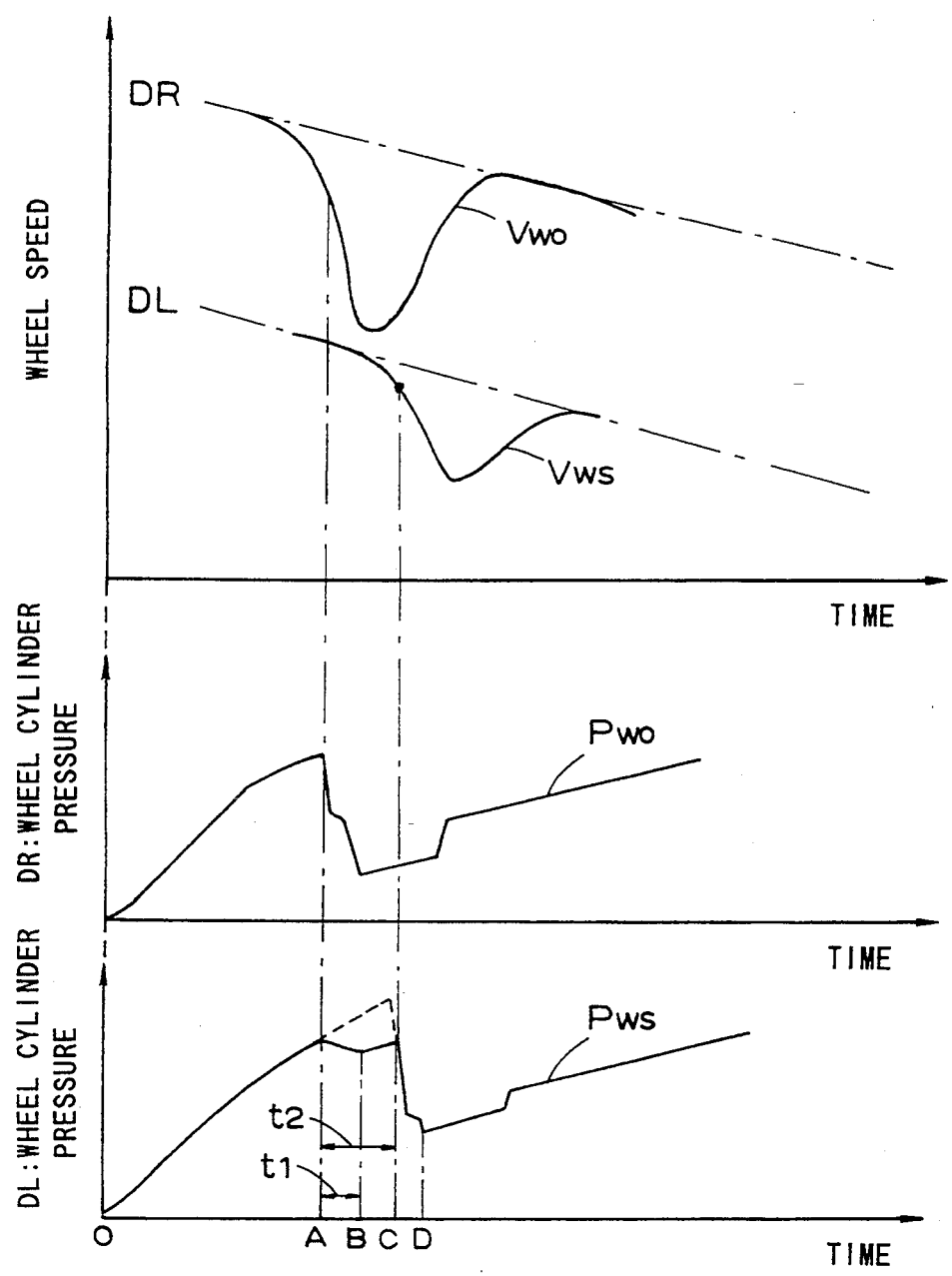
FIG. 6 is a diagram showing the variation of wheel speeds of driven wheels and wheel cylinder pressures during the anti-skid control operation in the above embodiment.

Referring to FIG. 6, the operation of the present embodiment in the vibration control will be explained hereinafter. When the anti-skid control is initiated with respect to the driven wheel DR, the wheel cylinder pressure Pwo for the driven wheel DR is decreased at a position "A". If the differential speed between the wheel speed Vws of the driven wheel DL and the wheel speed Vwo of the driven wheel DR (Vws-Vwo), i.e., the differential speed between the wheel speeds of the controlled wheel and the paired wheel, is greater than the predetermined value V1, and if the acceleration slip is not occurring on the driven wheel DL (controlled wheel), the gradual decrease mode is set until the predetermined time t1 elapses, so that the wheel cylinder pressure Pws for the driven wheel DL is gradually decreased. Then, from a position "B" in FIG. 6, where the predetermined time t1 has elapsed, until the predetermined time t2 elapses, the gradual increase mode is set. After the predetermined time t2 has elapsed at a position "C" in FIG. 6, the anti-skid control on the driven wheel DL begins to set the decrease mode, and then the wheel cylinder pressure will be increased with the wheel speed Vws recovered.

Figure 7:
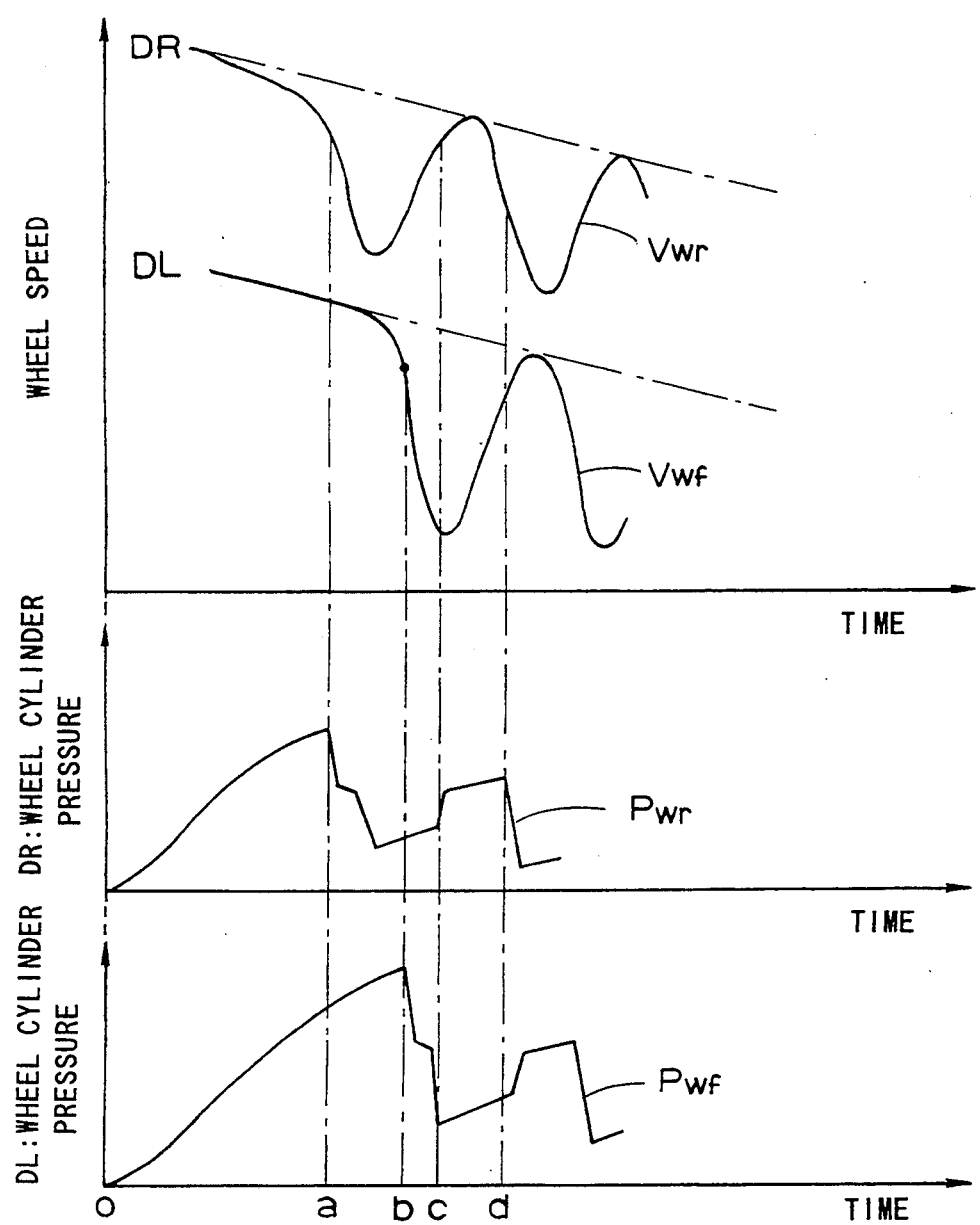
FIG. 7 is a diagram showing the variation of wheel speeds of driven wheels and wheel cylinder pressures during the anti-skid control operation in the prior art.

As described above, when the wheel speed Vwo of the driven wheel DR (paired wheel) is recovered and the differential gear mechanism operates, the wheel cylinder pressure for the driven wheel DL (controlled wheel) is gradually decreased. Therefore, the skid of the driven wheel DL will become small, and it can be avoided that the wheel cylinder pressure is largely decreased. Namely, since the skid of the driven wheel DL is small and a decreasing rate of a road holding load is small, the differential gear mechanism will not affect much on the braking operation of the driven wheels DR, DL. Consequently, as is clear in comparison with the case in the prior art in FIG. 7, the large skid as in the prior art will not occur on the driven wheels DR, DL in the anti-skid control operation, so that the vibration of the vehicle body will not occur as shown in FIG. 6, and a stable braking operation with a good braking feeling will be ensured.

It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. An anti-skid control system for an automotive vehicle having a pair of driven wheels linked by a differential gear mechanism and a pair of non-driven wheels, comprising:
   wheel brake cylinders operatively connected to said driven wheels and non-driven wheels, respectively, for applying a braking force thereto;
   a hydraulic pressure generator for supplying a hydraulic braking pressure to each of said wheel brake cylinders;
   actuating means disposed between said hydraulic pressure generator and each of said wheel brake cylinders for controlling the hydraulic braking pressure in each of said wheel brake cylinders;
   wheel speed detecting means for detecting a wheel speed of each of said driven wheels and non-driven wheels, and for providing an output signal corresponding to said wheel speed respectively;
   braking force control means for controlling said actuating means in response to said output signal of said wheel speed detecting means to control the braking force applied to at least said driven wheels, said braking force control means including determination means for determining whether a speed differential between the wheel speeds of said driven wheels is greater than a predetermined value when the braking force applied to one of said driven wheels is controlled by said actuating means, and increase restraining means for restraining the hydraulic braking pressure from being supplied to one of said wheel brake cylinders operatively connected to the other one of said driven wheels when said determination means determines that said speed differential is greater than said predetermined value.

2. An anti-skid control system according to claim 1, wherein said increase restraining includes means for reducing a rate of increase of the hydraulic braking pressure supplied to one of said wheel brake cylinders operatively connected to the other one of said driven wheels when said determination means determines that said speed differential is greater than said predetermined value.

3. An anti-skid control system according to claim 1, wherein said increase restraining means includes means for reducing a rate of increase of the hydraulic braking pressure supplied to one of said wheel brake cylinders operatively connected to the other one of said driven wheels when said determination means determines that said speed differential is greater than said predetermined value.

4. An anti-skid control system according to claim 1, wherein said determination means includes means for determining whether said one of said driven wheels is in an acceleration slip condition, and wherein said braking force control means prohibits the operation of said increase restraining means when said determination means determines that said one of said driven wheels is in the acceleration slip condition.

5. An anti-skid control system according to claim 4, wherein said determination means further includes means for determining the acceleration slip condition in accordance with the output signal fed from said wheel speed detecting means.

6. An anti-skid control system according to claim 1, wherein said increase restraining means includes means for providing a gradual decrease mode and gradual increase mode to control said actuating means, said increase restraining means providing the gradual decrease mode before lapse of a first predetermined time period after the initiation of said anti-skid control, and providing the gradual increase mode before lapse of a second predetermined time period after lapse of the first predetermined time period.

* * * * *